May 30, 1961  J. F. HERRMANN ET AL  2,986,069
PROJECTORS

Filed Dec. 5, 1956  4 Sheets-Sheet 1

INVENTORS
JOHN F. HERRMANN
RICHARD M. GILE
BY
ATTORNEYS

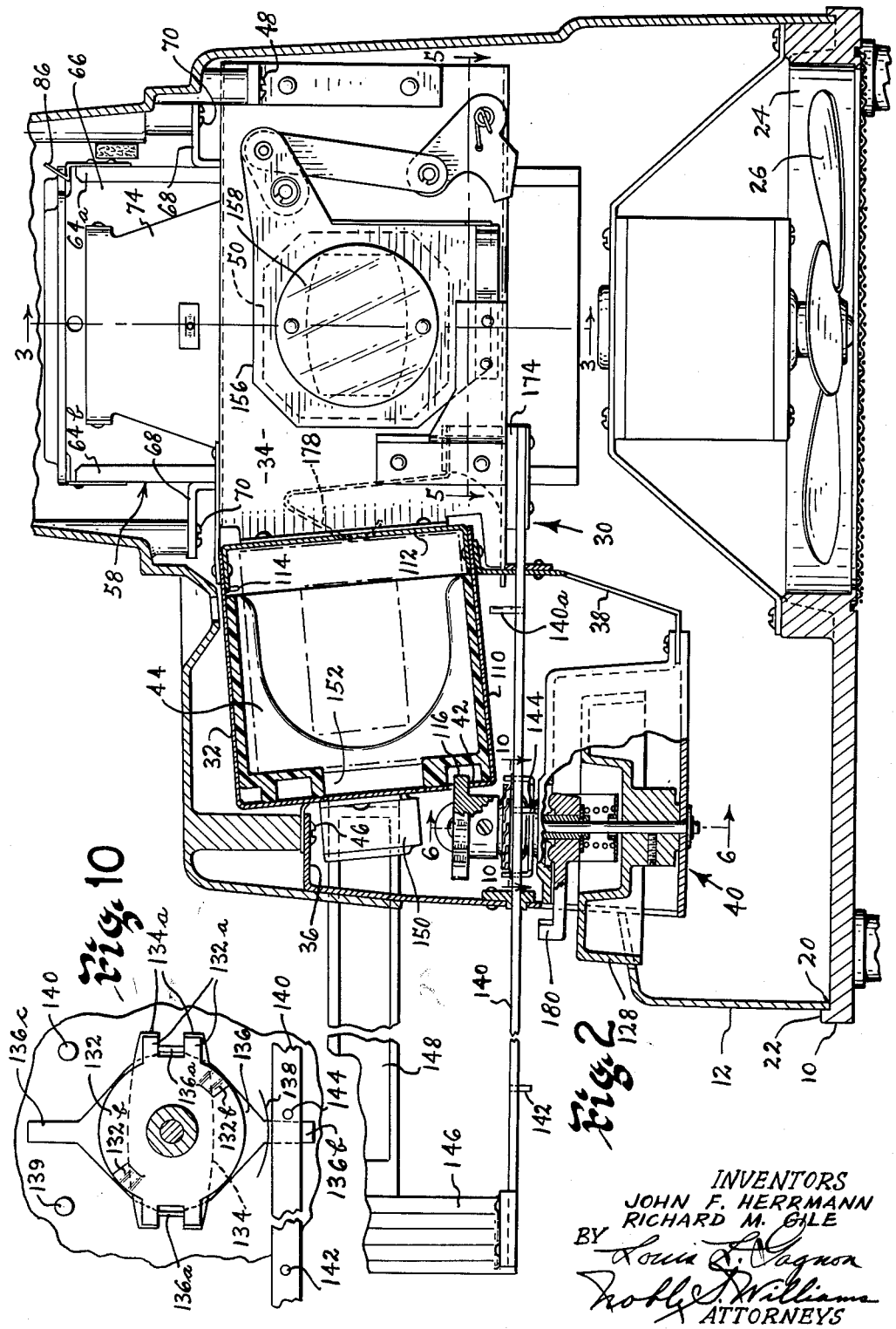

May 30, 1961 J. F. HERRMANN ET AL 2,986,069
PROJECTORS
Filed Dec. 5, 1956 4 Sheets-Sheet 4
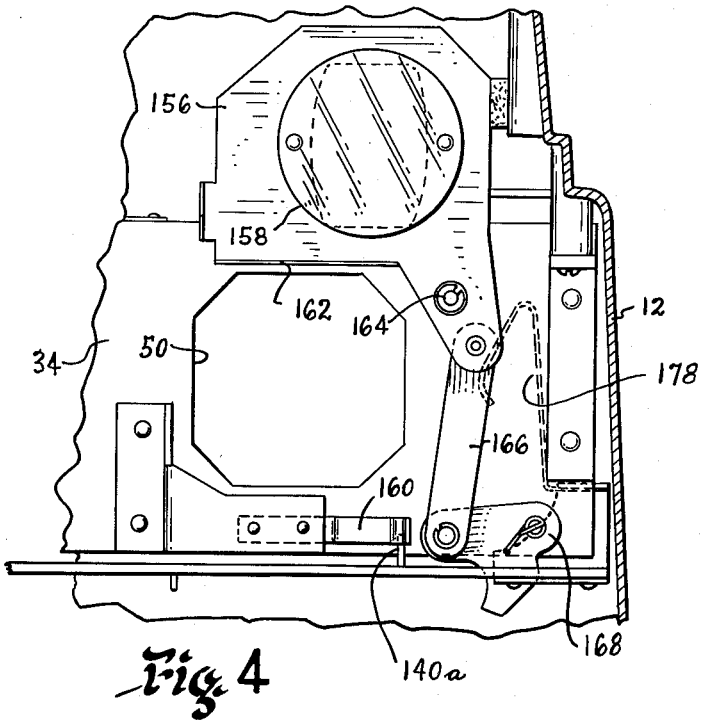
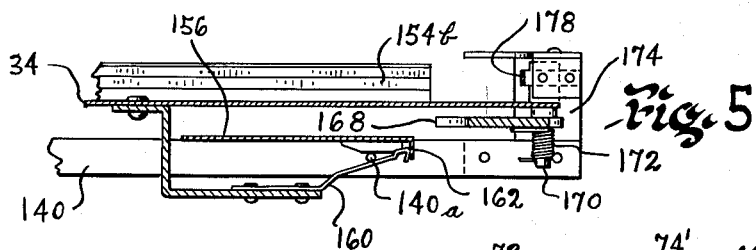
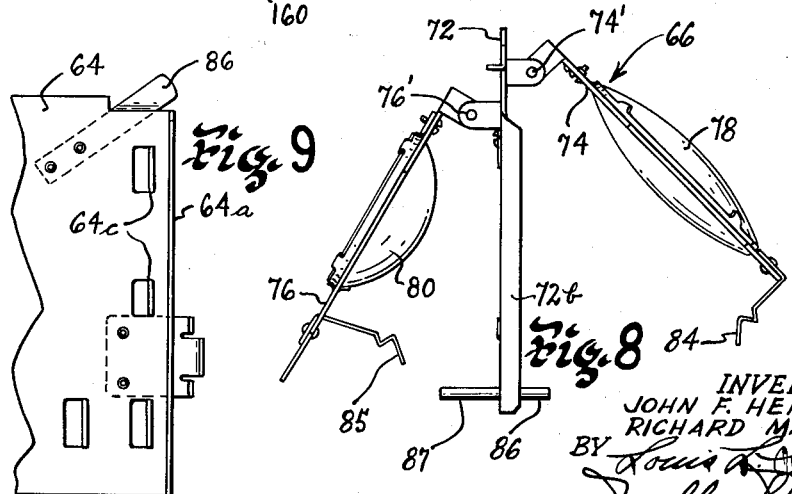
INVENTORS
JOHN F. HERRMANN
RICHARD M. GILE
BY
ATTORNEYS

United States Patent Office 2,986,069
Patented May 30, 1961

2,986,069
PROJECTORS

John F. Herrmann, Pittsford, N.Y., and Richard M. Gile, Kingston, Mass., assignors to American Optical Company, Southbridge, Mass., a voluntary association of Massachusetts Filed Dec. 5, 1956, Ser. No. 626,344

3 Claims. (Cl. 88—28)

This invention relates to slide projectors and the like, and more particularly to slide projectors of sturdy, compact, and efficient construction and arranged to successively and automatically position individual photographic slides of a collection of slides in the projection beam of the instrument so as to be projected thereby during manual manipulation thereof.

More specifically, the invention comprises a slide projector having means for receiving and supporting a tray for photographic slides, color transparencies and the like, means for removing one slide or transparency at a time from the supported tray and for positioning same at a projection aperture and in an illumination beam of the projector, means for returning each slide or transparency to its proper storage position in the tray after projection, means for automatically advancing the tray one increment of movement after the displaying of each slide, and light control means operable independently of the sliding movement of the individual slides into and out of the projection beam but coordinated therewith in such a manner as to expose each slide when positioned at the projection aperture and to intercept and reduce by a controlled amount the intensity of the beam when no slide is at said projection aperture.

The operator actuated mechanism for positioning one slide at a time in the projection beam and for thereafter returning same to its proper position in a slide tray also includes pawl and ratchet means under the control of the operator for advancing the tray an increment of movement following the displaying of each slide as well as associated detent means of such construction and arrangement as to allow the tray to be moved forward manually as many increments as might be desired between the displaying of separate slides. Also, this mechanism is provided with manual control means whereby suitable adjustment thereof may be made when desired for allowing not only manual forwarding movement of the slide tray but also unlimited reverse movement thereof when needed.

The slide projector construction and arrangement are such as to compactly and completely house not only most of the slide and tray actuating parts but also it will completely accommodate one slide tray at a time therewith. The arrangement of these parts and the optical components of the projector are such as to allow a ventilating fan to be positioned in a lower part of the projector and located with particular reference to the slide being displayed, the lamp housing, the condenser chest, and the objective. The bottom of the projector is completely closed except for the fan intake opening and thus the interior of the housing will be "pressurized" and this will maintain the parts at a relatively cool temperature during continued operation of the projector.

The condenser chest is of an improved and convenient arrangement and is such that it may be easily removed from the instrument as a unit and, being in "book form" so to speak, may be readily opened up to expose all optical surfaces of the several optical elements carried thereby for cleaning without the possibilities of having these elements later wrongly replaced in the chest and, of course, with much less chance of same being dropped or injured during cleaning of same.

It is, accordingly, an object of the present invention to provide a sturdy, compact, and efficient slide projector or the like comprising means for receiving and supporting a slide tray in an operative position adjacent slide-supporting and positioning means of the projector, as well as means for moving one slide at a time into a projection position in the instrument, means for returning the slide to its normal position in said tray, means operable independently of the movement of said slide but coordinated in movement therewith for exposing said slide while in said projection position and for controlling the amount of illumination of the projection beam when no slide is at the projection aperture, and means for automatically advancing the slide tray one increment of movement at a time following the return of each displayed slide to its position in the slide tray.

It is an additional object of the invention to provide in a slide projector or the like, and in conjunction with the means for controlling the illumination beam thereof, means of predetermined optical properties for reducing the intensity and the character of said beam at times while no slide is being projected thereby.

It is another object to provide for such an optical projector a readily removable condenser lens chest which is of such construction and arrangement that the surfaces of optical elements carried thereby may be cleaned or inspected easily and replaced in the instrument for operation without appreciable danger of damage to or misarrangement of said elements occurring thereto.

It is a further object of the present invention to provide in conjunction with a slide projector and slide positioning and automatic tray-advancing mechanism of the character described, manually operable means for enabling said tray to be advanced as many increments of forward movement at a time as desired and to be manually moved in a reverse direction when desired any required number of increments.

Other objects and advantages of the present invention will become apparent from the detailed description which follows when taken in conjunction with the accompanying drawings in which:

Fig. 2 is a transverse sectional view taken substantially upon section line 2—2 of Fig. 1 and looking in the direction of the arrows;

Fig. 4 is a vertical transverse sectional view showing a part of the structure of Fig. 2 but in another operative position thereof;

Fig. 5 is a horizontal sectional view taken substantially upon section lines 5—5 of Fig. 2 and looking in the direction of the arrows;

Fig. 8 is a side elevational view of the condenser chest and lens assembly removed from the projector of Fig. 1 and showing the chest in opened position;

Fig. 9 is a fragmentary view of a part of the structure of Fig. 3; and

Fig. 10 is a sectional view taken substantially upon section line 10—10 of Fig. 2 and looking in the direction of the arrows.

Figure 1:
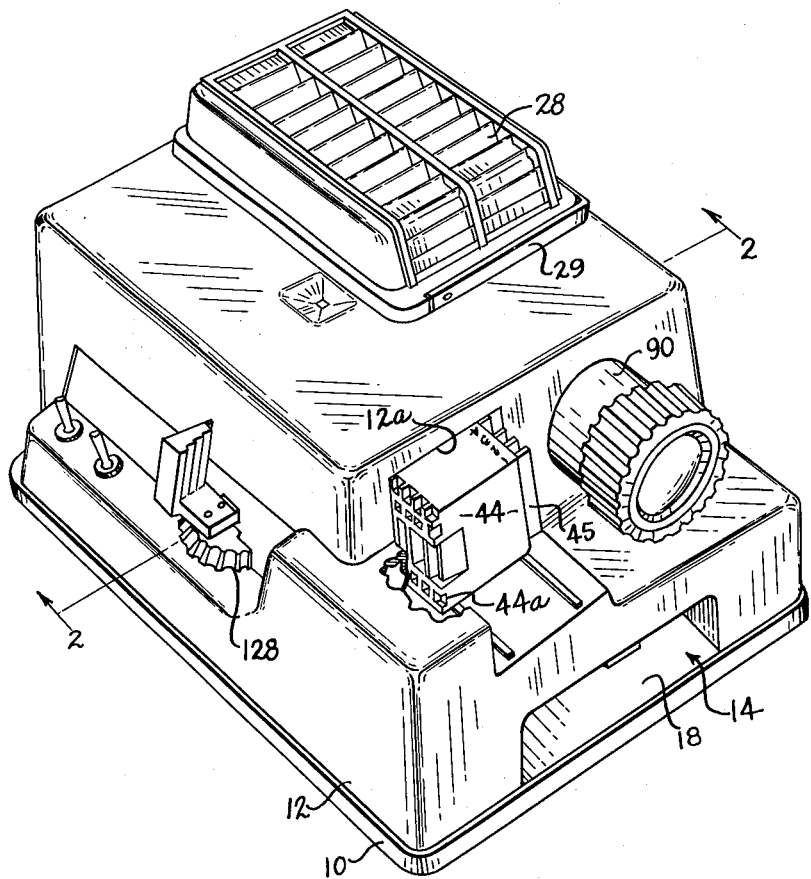
Fig. 1 is a perspective view showing a slide projector embodying the present invention and showing a tray and slides operably associated therewith.

Referring to the drawings in detail and particularly Figs. 1 and 2, it will be seen that a slide projector embodying the present invention comprises a generally flat (preferably die cast metal) base 10 upon the upper side of which is bolted or otherwise removably secured a hollow main housing 12. This housing likewise is preferably of a die cast construction and has, at its forward end, a centrally disposed recess 14 for accommodating the fingers of a person lifting the projector.

The recess 14 is closed by a pocket-like pressed metal housing plate 18. The plate 18 is secured to the inside front wall of the housing 12 and thus the plate 18 and housing 10 together provide a substantially continuous lower peripheral edge 20 for the housing 12. The peripheral edge 20 is arranged to fit closely within a continuous outer edge flange 22 formed integrally with the base 10. The construction of the base 10 and housing 12, therefore, is such as to substantially completely enclose most of the mechanical and optical parts of the projector with the result that these parts will not only be protected from injury but also a great deal of dust which might otherwise collect within the instrument will be excluded. Additionally, since an air intake opening 24 is the only opening of any material size within the base and is just sufficient to accommodate an electric motor driven fan 26, and since no openings of material size, except for a hot-air exhaust louver construction 28 in the top of the housing 12, the arrangement of parts is such that the interior of the instrument is, in effect, pressurized. Thus, all parts of the instrument housing are more uniformly maintained at a cool operating temperature. No part of the housing is uncomfortable to touch.

Within the main housing 12 is located a removable structure or sub-assembly 30 comprising a slide tray-supporting tunnel 32 of the tubular cross-section and formed of sheet metal and having a transverse supporting plate 34 firmly secured to one side thereof. A first supporting bracket 36 is located at the opposite side of the tubular tunnel 32 and a second supporting bracket 38 is located beneath the tubular tunnel. Together, these brackets serve to support a tray-actuating mechanism 40 in operative relation to a slot 42 in the tubular tunnel 32 and to a slide tray 44 when positioned within the tunnel, in a manner which will be more fully presently described.

These parts may be secured together as a unitary structure as by rivets or the like and then the structure fastened in place within the housing 12 by screw means 46 and 48 extending upwardly through struck-out lugs or the like on the structure. Screw means 46 and 48 extend into threaded openings in the housing 12.

Figure 3:
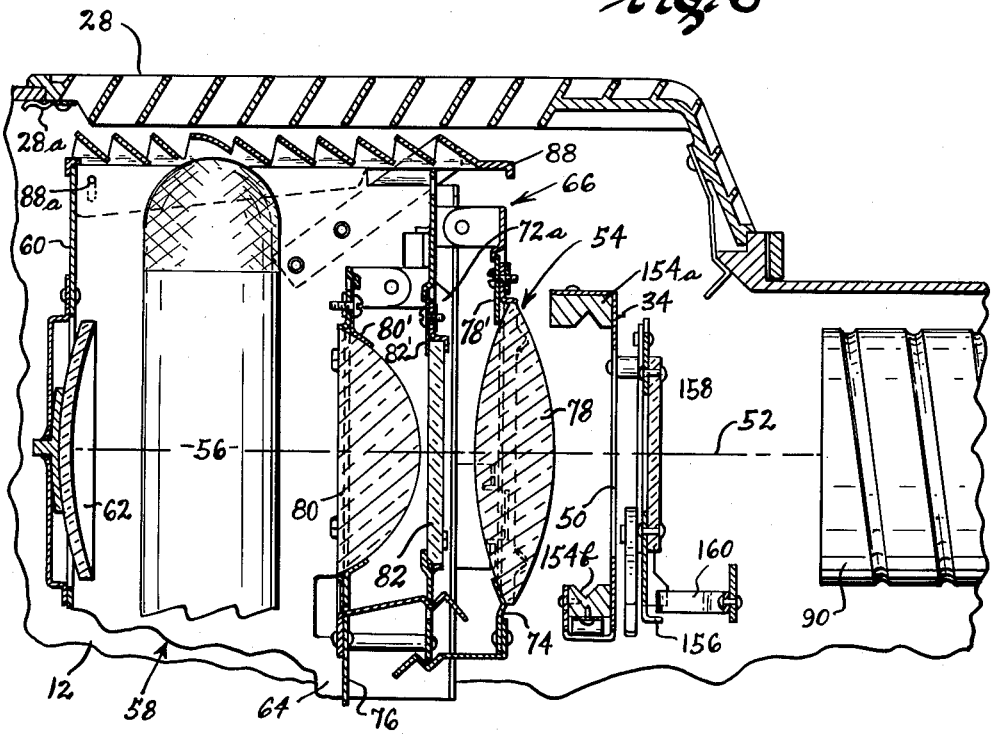
Fig. 3 is a partial longitudinal sectional view taken substantially upon line 3—3 of Fig. 2 and looking in the direction of the arrows.

As shown in Figs. 2 and 3, the transverse supporting plate 34 is provided with a projection aperture 50 and immediately rearwardly thereof and in optical alignment therewith along an optical or projection axis 52, are positioned a condenser lens system 54 and a light source 56. The light source 56 is carried by conventional means (not shown) within a lamp housing 58, the rear wall 60 of which supports a spherical reflector 62 and a pair of spaced side walls 64 extend forwardly from the rear wall. The rear wall and side walls are spaced from adjacent parts of the outer housing 12 to provide good ventilation. The side walls 64 at their forward ends (see also Fig. 9) are arranged to slidably receive and support a removable condenser chest 66 carrying the condenser lens system 54 mentioned above, and upon the outer sides of the side walls 66 are arranged suitable means in the form of pairs of brackets 68 through which screws or the like 70 extend. These screws extend into tapped openings in the housing 12 and thus the entire lamp housing 58 and parts carried thereby may also be preassembled before the structure is secured within the main housing 12.

The removable condenser chest 66 is arranged in "book form," as clearly indicated in Fig. 8, and comprises a central apertured plate 72 to which front and rear apertured plates 74 and 76 are hingedly secured. The hinge means for these plates are indicated at 74' and 76' respectively. In Fig. 3, it will be seen that plate 74 is suitably flanged at the central aperture therein so as to detachably support a front lens element 78 and a releasable retaining finger 78' serves to secure the element in place. Rear plate 76 likewise is suitably at its central aperture for detachably supporting a rear lens element 80 and is held in place by a releasable lens retaining finger 80'. Together, these elements 78 and 80 constitute the previously mentioned condenser system 54. In a similar manner, a heat screen 82 is detachably carried by the plate 72 which is suitably flanged at its central aperture and provided with a releasable retaining finger 82'.

From Fig. 8, it is thus clear that both sides of the optical elements 78, 80, and 82 are easily accessible for cleaning purposes or the like. Spring clips 84 and 85 are arranged to releasably engage with edge portions of plate 72 and thus serve to firmly retain plates 74 and 76 to which they are secured in closed position. In order to obtain proper spacing of elements 78 and 80, stops 86 and 87 are provided near the lower edge of plate 72. Of course, these spring clips are shaped so as to firmly draw the plates 74 and 76 toward the stops when "the book" is closed.

A pair of flanges 72a and 72b on central plate 72 serves as guide means for the condenser chest as same is inserted between the side walls 64 of the lamp housing by sliding same downwardly between inwardly turned front edge portions 64a and 64b (see Figs. 2 and 9) of the side walls and a plurality of struck-in flanges 64c suitably spaced rearwardly of the flanges 64a and 64b. After the chest 66 is in place in front of the light source 56, a spring clip 86 carried by one of the side walls 64 serves to prevent accidental upward movement of the chest. Thereafter, a louvered sheet metal cover 88 hinged at 88a to the lamp housing may be swung downwardly to overlie the bulb 56 and close the top of the lamp housing.

Overlying cover 88 and in close relation thereto is the louvered cover 28 previously referred to. Since the louvers in the two covers slope oppositely, an efficient light trap is formed. A pair of fingers 28a at the rear edge of the cover 28 and a spring catch 28b at the forward edge allow this cover to be easily removed for access to the interior of housing 28. A carrying bail or handle 29 (see Fig. 1) is pivotally connected to the housing 28 at longitudinally spaced points forwardly and rearwardly of the cover 28 and is so proportioned as to fit closely around the cover receiving part of the housing and be out of the way when not in use.

Optically aligned with the light source 56, condenser lens system 54 and projection aperture 50 in transverse plate 34 is an objective 90 which extends through an opening in the housing 12 and has engagement with suitable detent means (not shown) so that same may be readily axially adjusted for focusing purposes or even removed when desired.

The tubular tunnel 32, referred to previously, extends longitudinally of the projector and has its open ends adjacent and aligned with front and rear wall openings in the main housing 12 so as to receive the slide tray 44 with a plurality of slides 45 at the rear thereof and allow same to move longitudinally therethrough. The front opening is indicated by numeral 12a in Fig. 1. The tunnel 32 is, in fact, formed by two generally channel-shaped members 110 and 112 (see Fig. 2) which are carefully riveted or otherwise secured together so as to define what may be termed a relatively large space for the slide tray 44 and an adjacent smaller space for accommodating the ends of the slides or transparencies projecting outwardly from the tray. The space for the tray is of just the right size to slidably receive and guide the slide tray 44 and is determined, in part, by an inturned flange 114 on one of the channels.

Figure 6:
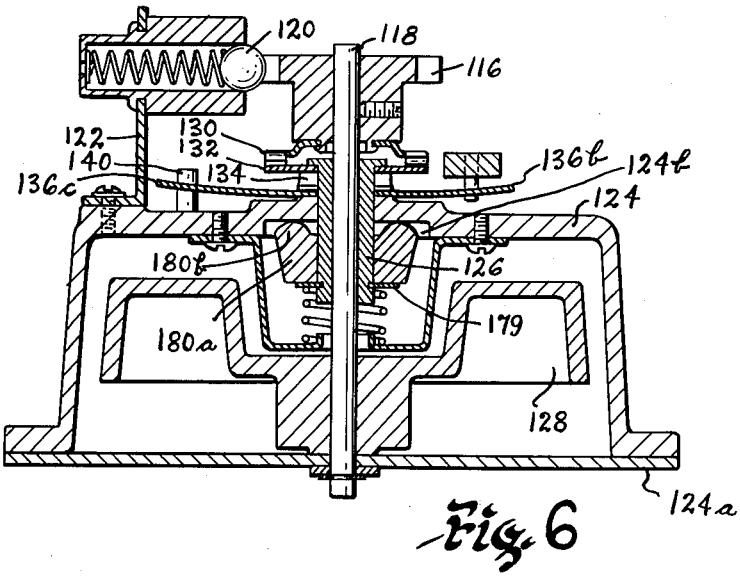
Fig. 6 is a vertical sectional view taken substantially upon line 6—6 of Fig. 2 and looking in the direction of the arrows.

The inturned flange 114 serves one very important function in that it prevents sidewise play or movement of the tray 44 as same is pressed laterally at its outer lower corner by a driving gear 116 which extends into the tunnel 32 through the previously mentioned slot 42 and engages with a longitudinally disposed rack 44a (see Fig. 1) formed in the bottom of the tray. The gear 116 is secured, as shown in Fig. 6, to a shaft 118 for rotation thereby and is indexed by spring pressed ball detent means 120 supported by a fixed arm 122 secured to the top of the housing 124 of the tray-actuating mechanism 40.

The lower end of shaft 118 is journaled in a removable bottom cover portion 124a of the housing 124. An intermediate part of said shaft, however, is arranged for rotation in a flanged collar 126 and this flanged collar is, in turn, arranged to turn in an opening in an upper part of housing 124. An actuating drum or wheel 128 is secured to a lower part of shaft 118 and extends outwardly through an opening in housing 124 and an opening in the main housing 12 so as to be accessible to the operator of the projector.

Thus, it will be clear that when only these parts are operative, manual rotation of the drum 128 will rotate shaft 118 and gear 116 and cause longitudinal movement of the tray 44; and also clear that, at the same time, step-by-step indexing will be effected by detent 120.

A clutch element 130, however, is firmly secured to the bottom of gear 116 and a complementary clutch element 132 is rotatably positioned on the upper end of flanged collar 126. Together, these elements constitute a positive one-way clutch mechanism when held in the position shown in Fig. 6. This positioning of the clutch elements is brought about by the action of an arched leaf spring 134 which continuously presses the element 134 upwardly. Spring 134 has a central opening therein for receiving the collar 126 and, as shown in Fig. 10, has its opposite free ends 134a bifurcated and bearing upwardly against protruding pairs of spaced arms 132a on lower clutch element 132.

A control plate 136 likewise is centrally apertured to fit about the flanged collar 126 and has a pair of bent-up finger portions 136a at opposite sides thereof. Fingers 136a are arranged to fit between the spaced free ends 134a on leaf spring 134 and also between the spaced arms 132a on the lower clutch element 132. A forwardly extending control arm 136b and a rearwardly extending limiting arm 136c are also provided upon control plate 136. Accordingly, if sidewise pressure is exerted on control arm 136b, plate 136 will pivot in one direction or the other about shaft 118, as indicated by the double-headed arrow 138, and such pivoting will be limited by a pair of fixed stops 139 and 140.

This back and forth pivoting of plate 136 will cause lower clutch plate 132 to pivot in like manner and since a pair of diametrically opposed upturned teeth 132b of proper shape for positive action are provided upon the lower clutch plate for engagement with any pair of diametrically opposed downwardly turned teeth of a ring of teeth 130a of complementary shape on the upper clutch plate 130, upper clutch plate will be rotated in a step-by-step manner when in the operative position indicated in Figs. 2 and 6; and this rotation of upper clutch plate 130 will be in a direction which will cause forward travel of tray 44 being propelled by gear 116. Ball detent 120, of course, functions at such times to prevent undesired reverse rotation of upper clutch plate 130 as lower clutch plate is ratcheted back to its starting position.

An elongated transversely slidable bar 140 having a pair of pins 142 and 144 thereon is arranged to alternately push arm 136b in opposite directions when the bar 140 is moved by the person operating the objective. The bar 140 is, in fact, connected to a control handle 146, and as is clear from Fig. 2, this handle is also connected to a bar-like slide pusher 148. The slide pusher is likewise in a transversely disposed position and is located above the bar 140. Both bars 140 and 148 are arranged to slide transversely in openings in the side wall of the main housing 12 and other suitable supporting means. However, bar 148 is of a shorter length than bar 140 and has its inner end arranged to slide in a saddle 150 secured to a side of the tunnel 32 which is slotted at this location to receive same.

Thus, when the handle 146 is moved inwardly, the inner end of bar 148 will move into the tunnel and enter the tray 44 through the proper one of a longitudinally arranged series of slots 152 provided in the tray. (The tray, it will be appreciated, is of more or less conventional construction.) This action of handle 146 will cause the inner end of bar 148 to engage the particular color slide or transparency positioned in the tray 44 in alignment therewith and continued inward movement will cause the transparency to slide out of the tunnel at the inner side thereof through a slot (not shown). At this time, the top and bottom edge of the transparency will be confined and guided by upper and lower V-grooved guide means 154a and 154b carried by the transverse plate 34. The lower guide means 154b is yieldably arranged for vertical movement in known manner so that each transparency will be exactly held in the focal plane of the objective 90 during projection thereof.

While each successive slide is being moved into position for projection, a shutter or dimmer 156 is positioned so as to intercept the projection beam, and since the shutter is provided with an aperture covered by a translucent colored filter member 158 the intensity of the illumination on the associated projection screen is thereby materially reduced as compared to conventional undimmed projection beam. In fact, if care is exercised, it is possible to select a filter of suitable soft color and transmission characteristics so that a minimum transition from the average light intensity when color slides of landscapes or the like are being shown to the light intensity provided on the screen when only the filter is in the projection beam. Thus, eye strain and eye fatigue will be reduced to a minimum.

As the transparency approaches its projection position, the lower bar 140 will also be moving inwardly and a pin 140a thereon will engage a side of a locking or latching spring 160 and flex same forwardly. When this action takes place, the free end of this spring, which normally engages a flange 162 on the shutter 156, will release the shutter and allow same to pivot about a fixed shaft 164 and snap to its up or open position. This snap action is produced by an arm 156a of the shutter which is pivotally connected by a link 166 to a small lever 168 pivotally mounted on a fixed stud 170 and has a torsion spring 172 thereon arranged to urge the lever and thus the shutter 156 toward the open position, shown in Fig. 4, so that the transparency at the projection aperture 50 will be projected.

By the time the flange 162 has been released so that the shutter can swing upwardly, a bracket 174 on the free end of the bar 140 will have passed beneath the small lever 168. However, the arrangement of the parts is such that should the bar 140 start to move in the opposite direction, bracket 174 will engage a lower arm of lever 168 and swing the lever and thus the shutter back to its beam intercepting position; at which time the latching spring 160 will again engage flange 162 and hold the shutter in its "closed" position.

A spring 178 carried by the bracket 174 is provided to engage the transparency at the projection aperture only after the bar 140 has moved sufficiently to swing the shutter 156 to closed position and is arranged to thereafter push the transparency back into its proper place in tray 44.

The inward movement of bar 140 to position a transparency at the projection aperture 50 causes the pin 142 on the bar to strike the operating arm 136b and swing the arm to the right as viewed in Fig. 10. This action "sets" the clutch elements 130 and 132 so that reverse or outward movement of the bar 140 will cause pin 144 to swing the arm 136b in the opposite direction. By the time the bar 140 has moved lever arm 136b sufficiently to cause the teeth 132b to engage a pair of teeth on clutch element 130, the upper bar 148 will be entirely clear of the bottom of tray 44 and at such time further outward movement of handle 146 (spring 178 flexes at this time) will cause gear 116 to move the tray 44 one increment in a forward direction. The action can be repeated to display each of the several slides contained in tray 44.

Figure 7:
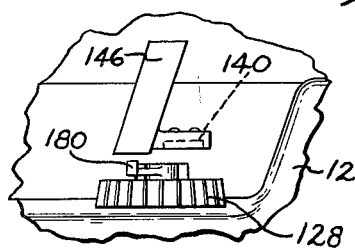
Fig. 7 is a fragmentary side elevation view showing a portion of the projector of Fig. 1.

At times, it may be desirable to move the tray back or rearwardly one, two or even more increments. Because of the one way ratcheting arrangement of the clutch elements 130 and 132, it is normally only possible to manually move the tray 44 rearwardly a single increment by rotation of the wheel or drum 128. However, a hand lever 180 (see Figs. 2 and 7) is arranged at one side of the instrument and immediately above the wheel 128 and this lever can be used to disconnect the clutch elements 130 and 132 in such a way that the tray can be easily moved forwardly or rearwardly as many increments or steps as desired. This lever has its hub portion 180a encircling the collar 126 (see also Fig. 6) and is in engagement with a washer 179 carried by collar 126 and has a projection 180b on its upper side which in one position bears against the inner surface of the housing 124 and in another position will seat in a recess 124b therein.

When the projection 180b is in recess 124b, the lever 180 and collar 126 will be spring-urged upwardly and the teeth on clutch elements 130 and 132 will engage. However, when the lever 180 is moved to its other operative position, the lever 180, washer 179, and collar 126 will be forced downwardly and the clutch elements will be separated. At this time, drum 128 can be rotated in either direction as many increments as desired.

Having described our invention, we claim:

1. A slide changing device comprising a supporting structure including means defining a projection aperture and a pair of guideways secured to said supporting structure and arranged to engage opposite edge portions of a photographic slide or the like and support same in optical alignment with said aperture, a shutter mechanism carried by said supporting structure and including a shutter pivotally mounted for movement from a closed position adjacent said aperture to an open position spaced therefrom, spring means constantly urging said shutter toward open position, a latch for holding said shutter in closed position, a slide transfer mechanism mounted on said structure and including an arm arranged to engage an edge of a photographic slide and move same from an initial position spaced from said aperture along said guideways into a projection position adjacent said aperture, said slide transfer mechanism including a pusher for engaging an opposite edge of the slide at said projection aperture and returning said slide to its initial position, an element carried by said transfer mechanism and arranged to release said latch as said photographic slide is being moved into said projection position, thereby allowing said shutter to move rapidly to its open position under the influence of said spring means, and camming means carried by said transfer mechanism and arranged to operatively engage a part movable with said shutter in such a way as to cause said shutter to return rapidly to its closed latched position as said transfer mechanism starts to move towards its initial position and before said pusher starts to move said slide away from said projection aperture.

2. A slide changing device comprising a supporting structure including means defining a projection aperture and a pair of spaced guideways secured to said supporting structure and arranged to engage opposite edge portions of a photographic slide or the like in an operative position adjacent said aperture, a tray support connected to said supporting structure and arranged to receive an elongated tray containing a plurality of photographic slides in side-by-side relation in individual compartments thereof, indexing means carried by said device and arranged to yieldably engage any one of a series of indentations on said tray so as to hold any selected one of said compartments in alignment with said guideways, a transfer mechanism slidably mounted on said structure and including a pusher arranged to engage an edge portion of a slide in any compartment aligned therewith and to urge same out of said tray and along said guideways to an inner position adjacent said aperture, said transfer mechanism including a second pusher arranged to engage an opposite edge portion of said slide when at said inner position and to move said slide back to its initial position in said tray, driving means responsive to outward movement of said transfer mechanism after said slide has been returned to its compartment for causing said tray to move an increment of travel in a predetermined direction for positioning the next successive slide compartment in said tray in alignment with said guideways, manual means connected to said driving means in such a manner as to disconnect said driving means from said transfer mechanism when moved to an inoperative position and a second manual means for effecting movement of said tray in either direction while said transfer means is in its outer position and said first manual means is in said inoperative position.

3. A slide changing device comprising a supporting structure including means defining a light aperture, a pair of spaced horizontally disposed guideways secured to said supporting structure and arranged to engage opposite edge portions of a photographic slide or the like and support same in optical alignment with said aperture, a tray support secured in fixed relation to said supporting structure and arranged to receive an elongated tray containing photographic slides or the like and to position same adjacent an end of said guideways, indexing means carried by said device and arranged to yieldably engage any one of a series of indentations on said tray so as to hold any selected one of said compartments in alignment with said guideways, a transfer mechanism slidably mounted on said device and including a pusher arranged to engage an edge portion of a slide in any compartment aligned therewith and urge same out of said tray and along said guideways to an inner position adjacent said aperture, said transfer mechanism including a second pusher arranged to engage an opposite edge portion of said slide when at said inner position adjacent said aperture and to move said slide back to its initial position in said tray, a shutter mechanism carried by said supporting structure and including a pivotally mounted shutter arranged for movement from a closed position adjacent said aperture to an open position spaced therefrom, spring means normally urging said shutter toward its open position, a latch for holding said shutter in its closed position, means actuated by said transfer mechanism as a photographic slide nears its inner position in alignment with said aperture for releasing said latch and allowing said shutter to move rapidly to its open position, means on said transfer mechanism arranged to operatively engage a cam surface on said shutter mechanism and cause said shutter to move rapidly to its closed position as said transfer means starts to move outwardly and before same starts to move the slide away from said aperture, and means responsive to outward movement of said transfer mechanism after said slide has been returned to its compartment for causing said tray to move an increment of travel in a predetermined direction for positioning the next successive slide compartment in said tray in alignment with said guideways.

(References on following page)

References Cited in the file of this patent

UNITED STATES PATENTS

| | | | |
|---|---|---|---|
| 482,238 | Force | Sept. 6, | 1892 |
| 773,786 | Colardeau et al. | Nov. 1, | 1904 |
| 1,001,965 | Leopold | Aug. 29, | 1911 |
| 2,519,251 | Johanson | Aug. 15, | 1950 |
| 2,590,492 | Bennett et al. | Mar. 25, | 1952 |
| 2,596,665 | Eagle | May 13, | 1952 |
| 2,671,378 | Burla | Mar. 9, | 1954 |
| 2,677,986 | Burla | May 11, | 1954 |
| 2,696,961 | Fox | Dec. 14, | 1954 |
| 2,711,602 | Wiklund | June 28, | 1955 |
| 2,756,630 | Goldberg | July 31, | 1956 |
| 2,878,719 | Lutes | Mar. 24, | 1959 |